(12) United States Patent
Datta (10) Patent No.: US 6,536,773 B2
(45) Date of Patent: Mar. 25, 2003

(54) COMPLIANT BRUSH SHROUD ASSEMBLY FOR GAS TURBINE ENGINE COMPRESSORS

(75) Inventor: Amitava Datta, East Greenwich, RI (US)

(73) Assignee: Advanced Components & Materials, Inc., East Greenwich, RI (US)

( * ) Notice: Subject to any disclaimer, the term of this patent is extended or adjusted under 35 U.S.C. 154(b) by 0 days.

(21) Appl. No.: 10/012,979

(22) Filed: Nov. 5, 2001

(65) Prior Publication Data

US 2003/0030220 A1 Feb. 13, 2003

Related U.S. Application Data

(60) Provisional application No. 60/246,182, filed on Nov. 6, 2000.

(51) Int. Cl.[7] .............................................. F16J 15/447
(52) U.S. Cl. ...................................... 277/355; 277/350
(58) Field of Search .................................. 277/350, 355

(56) References Cited

U.S. PATENT DOCUMENTS

| | | | | |
|---|---|---|---|---|
| 885,032 A | * | 4/1908 | De Ferranti ................. | 277/355 |
| 2,349,643 A | * | 5/1944 | Wesemeyer ................... | 15/182 |
| 2,878,048 A | | 3/1959 | Peterson | |
| 3,917,150 A | * | 11/1975 | Ferguson et al. ........... | 228/159 |
| 3,979,920 A | * | 9/1976 | Burgess et al. ............. | 61/84 |
| 4,281,838 A | | 8/1981 | Persson | |
| 4,358,120 A | | 11/1982 | Moore | |
| 4,457,515 A | * | 7/1984 | Eidschun .................... | 118/326 |
| 4,490,877 A | * | 1/1985 | Drumm ....................... | 15/182 |
| 4,679,619 A | * | 7/1987 | Wohrl et al. ................. | 165/81 |
| 4,781,388 A | | 11/1988 | Wohrl et al. | |
| 5,066,024 A | | 11/1991 | Reisinger et al. | |
| 5,090,710 A | | 2/1992 | Flower | |
| 5,165,758 A | | 11/1992 | Howe | |
| 5,183,197 A | | 2/1993 | Howe | |
| 5,316,318 A | | 5/1994 | Veau | |
| 5,474,305 A | * | 12/1995 | Flower ........................ | 277/53 |

(List continued on next page.)

FOREIGN PATENT DOCUMENTS

| | | |
|---|---|---|
| EP | 0 293 140 A2 | 11/1988 |
| EP | 0 866 248 A1 | 9/1998 |
| EP | 0 961 058 A2 | 12/1999 |
| FR | 379209 | 6/1907 |
| GB | 2 066 382 A | 7/1981 |
| WO | WO98/58230 | 11/1998 |
| WO | WO99/06673 | 2/1999 |

OTHER PUBLICATIONS

J. Short, A. Datta, J. Derby, R. England, R. Johnson, R. Loewenthal, B. Prior, P. Basu, "Brush Seal Development Program," Defense Information Systems Agency, Defense Technical Information Center, Fort Belvoir, Virginia, (cover, pp. 1, 25 and 26).

*Primary Examiner*—Anthony Knight
*Assistant Examiner*—Lisa Bannapradist
(74) *Attorney, Agent, or Firm*—Salter & Michaelson (57) ABSTRACT

A brush shroud assembly for reducing the tip clearance between a rotating blade and an engine casing is disclosed. The assembly includes a plurality of bristle packs supported within a housing such that the bristle distribution at the inner diameter of the bristle packs is substantially continuous. The continuous surface is created by mounting the bristles packs within a housing such that the packs are flared, i.e. width at the outer diameter of the bristle pack is smaller than that at the inner diameter. Various embodiments are disclosed for mounting the flared bristle packs to form a substantially continuous inner diameter. The bristle strips may be mounted in one or more annular rings, may be secured within one or more channels in the housing, the bristle packs may be formed into a tufted ring, or any of these may be utilized in combination with a backplate supporting an abradable seal, i.e. a hybrid design.

17 Claims, 8 Drawing Sheets

U.S. PATENT DOCUMENTS

| | | | | |
|---|---|---|---|---|
| 5,480,160 A | * | 1/1996 | Harms | ......................... 277/355 |
| 5,556,172 A | | 9/1996 | Howe | |
| 5,794,938 A | | 8/1998 | Hofner et al. | |
| 5,799,952 A | | 9/1998 | Morrison et al. | |
| 6,027,121 A | | 2/2000 | Cromer et al. | |
| 6,042,119 A | * | 3/2000 | Bagepalli et al. | ........... 277/355 |
| 6,109,616 A | | 8/2000 | Mayr | |
| 6,120,622 A | * | 9/2000 | Mayr et al. | .................. 148/516 |
| 6,139,019 A | * | 10/2000 | Dinc et al. | ................... 277/347 |
| 6,293,553 B1 | | 9/2001 | Werner et al. | |
| 6,308,957 B1 | * | 10/2001 | Wright | ....................... 277/355 |

* cited by examiner

COMPLIANT BRUSH SHROUD ASSEMBLY FOR GAS TURBINE ENGINE COMPRESSORS

CROSS REFERENCE TO RELATED APPLICATIONS

This application claims priority under 35 U.S.C. §119(e) to co-pending U.S. Provisional patent application Ser. No. 60/246,182, entitled COMPLIANT BRUSH SHROUD CASING FOR GAS TURBINE ENGINE COMPRESSORS, filed Nov. 6, 2000.

TECHNICAL FIELD

The invention relates generally to a brush shroud assembly for sealing a gap between an engine casing and rotating blade, and, more specifically, to a brush shroud assembly including a bristle strip having a plurality of bristles mounted in a compliant casing such that the bristles are flared, the flared bristles forming a continuous surface for use in a gas turbine engine compressor to seal a blade-tip flow area.

BACKGROUND OF RELATED ART

Gas turbine engine compressors include an engine casing and a number of rotating blades disposed within the casing. As the blades rotate within the casing, there is a certain amount of clearance between the tip of the blades and the surface of the engine casing in order to prevent the tips of the rotating blades from contacting the engine casing and causing damage to the casing and the blade tips. In aircraft engines, it is desirable to minimize the amount of clearance between the tip of the compressor blade and the engine casing in order to maximize the engine's efficiency. From the standpoint of performance, the blade tip clearance should ideally be zero. However, from a practical standpoint, some tip clearance is necessary to avoid blade tip rub against the casing. The blade tip clearance has a significant effect on the compressor performance including aerodynamic efficiency, pressure ratio, and compressor stall margin. In the past, abradable seals have been utilized between the engine casing and the tip of the rotating compressor blade in order to minimize gap clearance to about 0.025", as measured between the tip of the rotating blade and the abradable seal.

Figure 1:
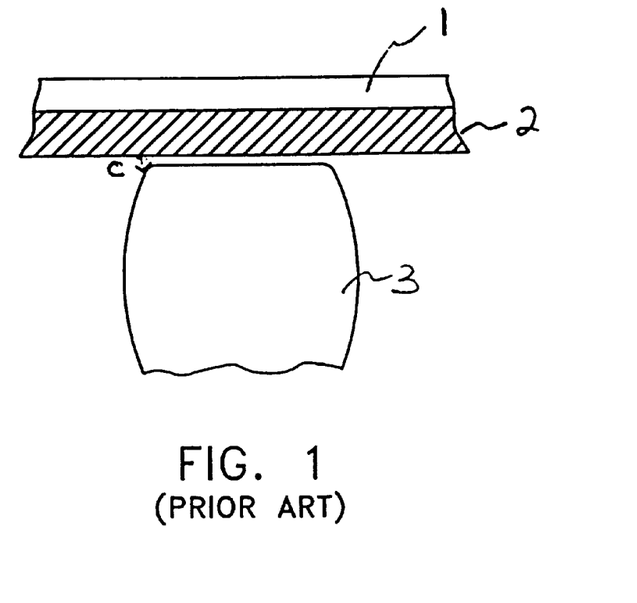
FIG. 1 is a partial cross-sectional schematic of an abradable seal of a prior art rigid compressor blade shroud.

A conventional abradable seal is illustrated in FIG. 1. With such seals, a rigid shroud casing 1 usually includes an inner surface having either a felt metal or a soft coating 2, typically sprayed nickel containing graphite. Both types of abradable seals are weak enough to abrade away when contacted by a high speed rotating blade 3, without wearing or damaging the blade tip during short-duration rubs, such as rubs which may occur during compressor stalls and hard landings. The designed clearance, "c", of the rigid abradable casing is large enough to avoid frequent rubs. However, during a short-duration rub, the clearance is further enlarged, permanently reducing the compressor performance, such as its efficiency and stall margin. Beyond a certain tip clearance enlargement and performance loss resulting from accumulated rub damage, the engine is removed from service and overhauled.

Figure 2:
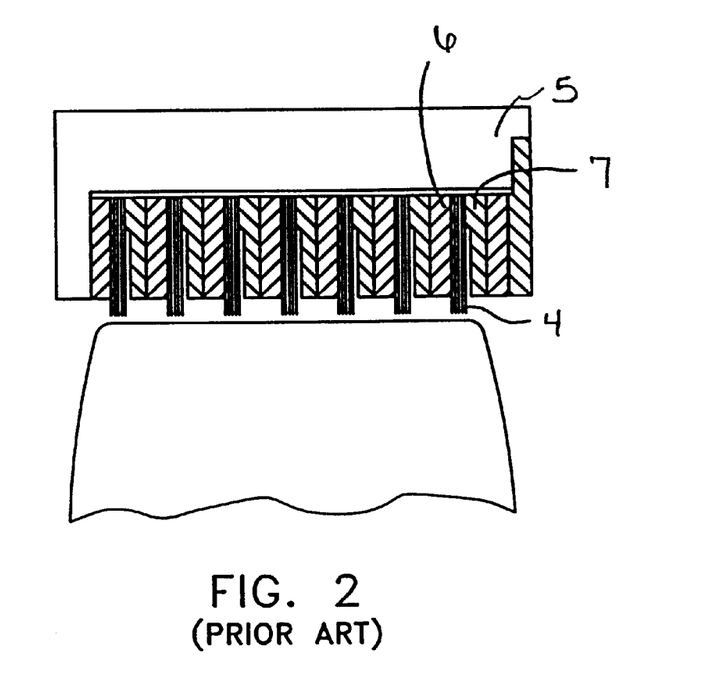
FIG. 2 is a partial cross-sectional schematic of a prior art compliant shroud utilizing a series of conventional brush seals with rigid front and back plates.

Conventional rigid shroud casings degrade compressor performance as the abradable seal wears away, and also increases the maintenance cost due to frequent engine overhaul and lost service. In order to further reduce the gap clearance and improve performance, a compliant shroud has been developed by Compressor Aero Research Laboratories (CARL), Wright Laboratories WPAFB, Dayton, Ohio, which incorporates staged conventional brush seals, as shown in FIG. 2. In this design, a number of conventional bristle packs 4 are attached to the rotor 5, and are further welded between a rigid front plate 6 and a rigid back plate 7. The bristles are inclined in the direction of rotation, as is conventional with brush seals, and the gap clearance between the tip of the bristles and the tip of the blade is reduced significantly, to about 0.005". In the event of a blade rub, the bristles deflect elastically and return to their original configuration, thus not enlarging gap clearance. Although the gap clearance is reduced, the clearance of the gap is not continuous since a continuous compliant brush surface is not present, due to the incorporation of front and back plates. The lack of a continuous surface can result in the creation of vortices within the region, thus lowering the compressor efficiency. Another important drawback of the CARL design is that the use of redundant front and back plates significantly increased the weight and cost of the system, which is particularly undesirable in aerospace applications where weight and cost reduction is important. In addition, welding the bristles to the front and back plates can also lead to increased cost, both initially and later, during repairs.

Figure 3:
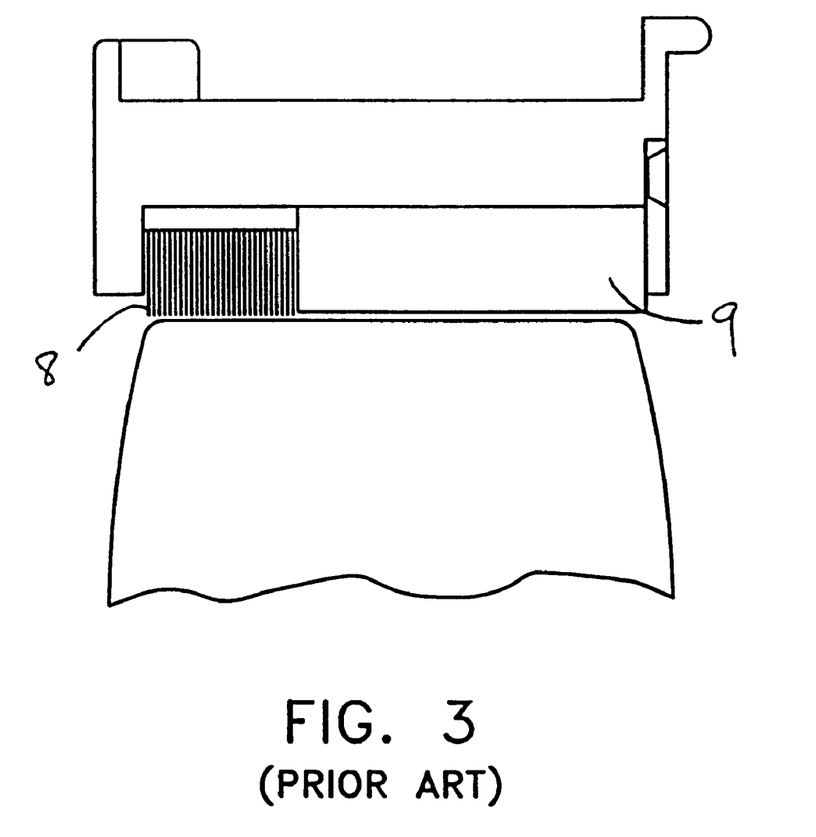
FIG. 3 is a partial cross-sectional schematic of a prior art hybrid compliant shroud having brushes mounted in a forward section, and a rigid shroud ring mounted rearwardly.

A hybrid brush shroud design has also been proposed by CARL, as illustrated in FIG. 3. In this design, a compliant brush casing containing multiple bristles 8 in approximately the front 30% of the chord length is abutted by a rigid shroud ring 9. Using fluid mechanical modeling, it has been demonstrated that the blade tip clearance is critical only in the front section. The tip clearance is significantly reduced in the front section containing the bristle packs. The rear section, containing the rigid shroud ring has an increased tip clearance, in order to prevent blade tip rub. This hybrid structure will reduce the fraction of the blade chord covered with expensive brush shroud, resulting in a lower cost. The brush shroud structure is placed only where it is needed, not the entire chord length. While FIG. 3 describes a concept, no design and fabrication methods have been proposed by CARL. In addition, if the rigid shroud ring is contacted by the rotor blade, it can damage both the blade and the shroud ring.

Therefore, there is a need in the art a compliant shroud casing which has a good resistance to damage caused by short-duration rotor rubs so as to allow for increased performance overall and less frequent engine repairs due to blade rub, and which is light-weight and cost effective to manufacture and replace, if needed.

SUMMARY

One object of the present invention is to provide a brush shroud assembly which is inexpensive and easy to manufacture, relatively light weight, and which can be readily replaced, as needed.

There is provided herein a compliant brush shroud assembly for reducing the tip clearance between a rotating blade and the engine casing and which improves compressor performance. The brush shroud assembly includes a plurality of bristle packs supported within a housing such that the bristle distribution at the free ends, or inner diameter, of the bristle packs is continuous (i.e. there are no significant gaps between adjacent bristle packs.) The continuous surface is created by mounting the bristles packs within a housing such that the packs are flared, i.e. the width (axial length) at the outer diameter of the bristle pack is smaller than the width at the inner diameter.

In one embodiment, the compliant brush shroud assembly having a flared configuration and continuous inner diameter is fabricated by using one or more annular shroud rings which are supported within the housing. Each shroud ring preferably has a U-shaped configuration and may be welded or otherwise joined to a flexible bristle strip fabricated by attaching a plurality of bristle packs to one or more flexible rails. In a second embodiment, the annular ring is eliminated and the flexible bristle strips are secured directly to the housing, through one or more grooves or channels disposed in the housing. In a third embodiment, the flared configuration and continuous inner diameter is achieved by mounting the bristles packs within a holding ring having a plurality of holes to form a "tufted" ring. In a fourth embodiment, any of the first three embodiments (annular shroud ring, insert, and tufted) are utilized in combination with a rigid shroud ring supporting an abradable seal to form a hybrid assembly.

Once installed, all of the illustrative embodiments significantly reduce the clearance between the rotating blade and the engine casing as compared with conventional designs. In addition, the modular manner in which the bristles are mounted allows the bristles to be readily replaced, as needed. This can reduce both the labor cost and the cost due to lost service. In addition, by eliminating traditional back and front plates utilized with conventional brush seals, the weight of the above embodiments is reduced as compared to such brush seals.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which.

DETAILED DESCRIPTION OF THE ILLUSTRATIVE EMBODIMENTS

A compliant brush shroud assembly for reducing the gap or clearance between a rotating blade and the engine casing and for improving performance of a gas turbine engine compressor is illustrated in FIGS. 4–11. The brush shroud assembly includes a plurality of bristle packs supported within a housing, preferably in rows, such that the bristle distribution at the free ends, or inner diameter ($I_D$), of the bristle packs is substantially continuous, i.e. there are no significant gaps between adjacent bristle packs at their free ends. Such a continuous bristle distribution enhances compressor performance because gaps are not present between the bristle strips at the surface which engages the rotor blade. In the present disclosure, the continuous surface is created by flaring the bristle packs, i.e. the width at the outer diameter ($O_D$) of the bristle pack is smaller than the width at the inner diameter ($I_D$) of the bristle pack such that the $O_D$ is tapered and the $I_D$ is flared relative to each other. To flare the bristle packs, their $O_D$ is constrained and is not continuous, since there are gaps between adjacent bristle packs at the $O_D$.

There are several ways that the compliant brush shroud assembly can be designed with a flared bristle configuration to form a substantially continuous bristle distribution across the width of the shroud. Four exemplary configuration will be described herein below: an annular shroud ring, an insert brush strip, a tufted ring, and a hybrid design. All of these embodiments include the aforementioned flared configuration. As used herein, the term "flared" with respect to the bristle packs, strips, or tufts means that the axial width at the inner diameter (or free ends) of the bristles is greater than that at the outer diameter. As also used herein, the term "bristle" refers to an individual strand, "bristle pack" refers to more than one bristle held together, and "bristle strip" refers to more than one bristle pack held together. In the embodiments which follow, all parts which are the same, or similar to, each other are noted with the same two last numbers, but preceded by a different numeral, depending upon the embodiment. For example, the housing in the embodiment of FIG. 1 is numbered 114, i.e. a "1 " as the prefix, followed by 14, whereas for the second embodiment the housing would be 214, and so on.

Figure 4:
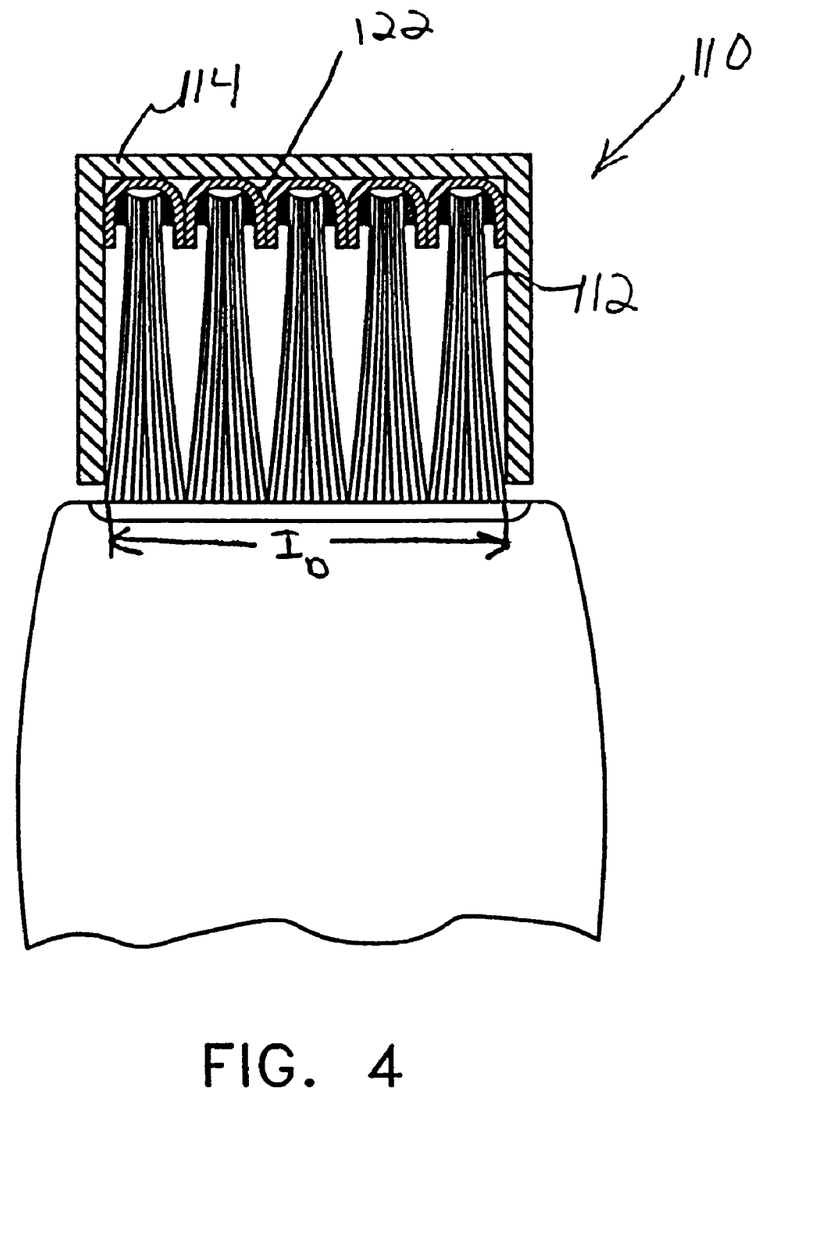
FIG. 4 is a side view of a compliant brush shroud assembly including multiple brush shroud rings, in accordance with a first embodiment of the present invention.
Figure 5A:
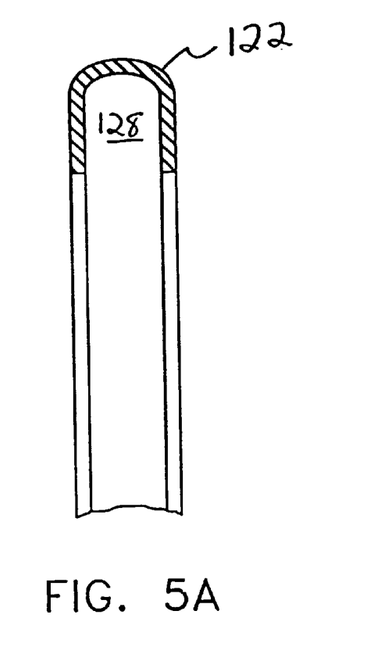
FIG. 5A is a cross-sectional view of an annular holder for mounting a bristle strip utilized in the embodiment of FIG. 4.
Figure 5B:
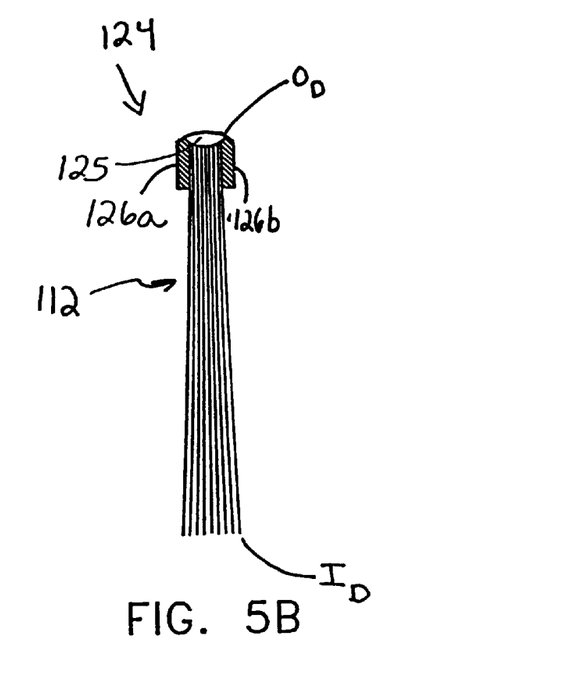
FIG. 5B is a cross-sectional view of a bristle pack mounted between two rails to form a bristle strip.
Figure 5C:
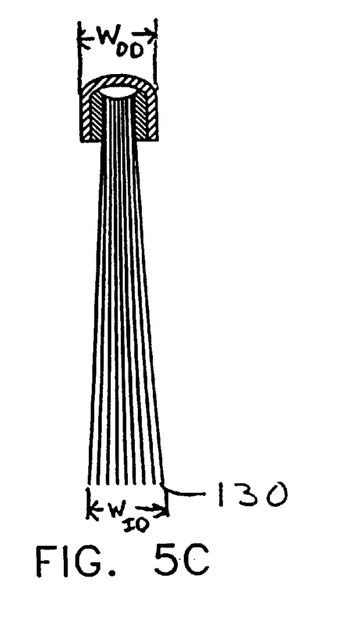
FIG. 5C is a cross-sectional view of an annular holder with the bristle strip mounted therein.
Figure 5D:
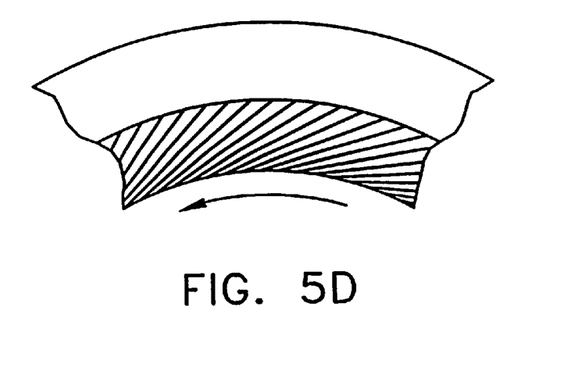
FIG. 5D is a schematic of an engine casing with a brush shroud assembly illustrating the direction of blade rotation.

In any of the four embodiments discussed herein below, the bristles are preferably angled in the direction of blade rotation (see FIG. 5D). In addition, the bristles may preferably be made of a high temperature alloy, such as a cobalt-based superalloy (for example Haynes 25) to help maintain the shape and orientation of the bristles, and to provide wear-resistance. The clearance between the free ends of the bristles and the tip of the rotating blade can be significantly reduced in any of the embodiments described herein below from the prior art to, for example about 0.005". As discussed herein above, the corresponding clearance of a conventional rigid casing is much larger, typically 0.025–0.05". During a short-duration rub, such as a compressor stall, the bristle packs deflect away elastically and spring back to restore the designed clearance when the rotor/blade deflection subsides to normal conditions. In contrast, when conventional abradable seals are worn, the clearance is permanently enlarged even after the rotor/blade deflection subsides to normal conditions. Referring now to FIGS. 4 and 5A–5C, the first embodiment or shroud ring configuration is illustrated. In this embodiment, the compliant brush shroud assembly 110 having a continuous $I_D$ is preferably fabricated by using one or more annular shroud rings 122 which are supported within housing 114, as best shown in FIG. 4. Each shroud ring preferably has a U-shaped configuration and may be welded or otherwise joined to a flexible bristle strip 124 (FIGS. 5A–5C.) In the exemplary embodiment, the flexible bristle strips 124 are fabricated by attaching a plurality of bristle packs 112 between a pair of flexible rails 126a, b for example by welding, as shown in FIGS. 5A–5C. After the bristle packs are secured to the rails 126a, b, the rails are preferably machined to a pre-determined width, such that the bristle strips (including the rails and weld 125), have a pre-determined width at the outer diameter "$O_D$" which is less the opening of the U-ring or the annular shroud ring. The bristle strips 124 may then be inserted and secured within the annular shroud ring 122.

The rails are inserted into the channel 128 defined by the ring such that the outer diameter of the rails are preferably in close contact with the inner diameter of the annular holder along the length thereof, and so that the free end 130 of the bristle packs extend from the holder (FIG. 5C). To make the $I_D$ of the shroud assembly continuous, the width of the U-ring, rails and bristle packs at the $O_D$ ($W_{OD}$) should be less than the width of the free end of the bristle packs at the $I_D$ ($W_{ID}$). In order to achieve the appropriate dimensions, the bristle packs are compacted or constrained at their $O_D$ by the rails and annular holder to reduce their aggregate width at the $O_D$. However, the constrained length of the bristle packs is a very small portion of the entire length, so that the bristle packs flare outward toward their free ends. For example, in the present embodiment the constrained length may be 8%–12%, preferably about 10% of the total length of the bristle packs although other percentages may be utilized. Thus, by constraining the $O_D$ to ensure that the $W_{OD}$ is less than the $W_{ID}$ the bristle strips flare outward, and are wider at their free ends than at the base of the rails. In order to further increase the flared dimensions at the free end, the bristle pack could be further compressed at an appropriate point midway between the bristle length to bend the bristle pack axially outward. For example, pinch rolls may be utilized as a flaring tool to further flare the free ends of the bristle packs. The annular shroud ring and bristle strips are then mounted within housing 114.

Figure 6A:
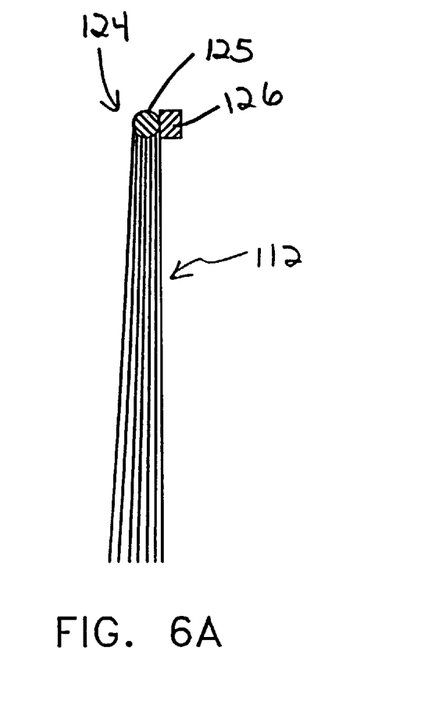
FIG. 6A is a cross-sectional view of a bristle pack attached to a single rail to form a bristle strip.
Figure 6B:
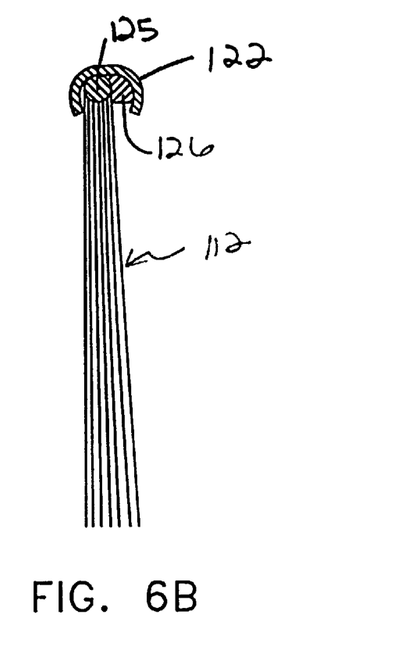
FIG. 6B is a cross-sectional view of the bristle strip of FIG. 6A mounted within an annular holder.
Figure 7:
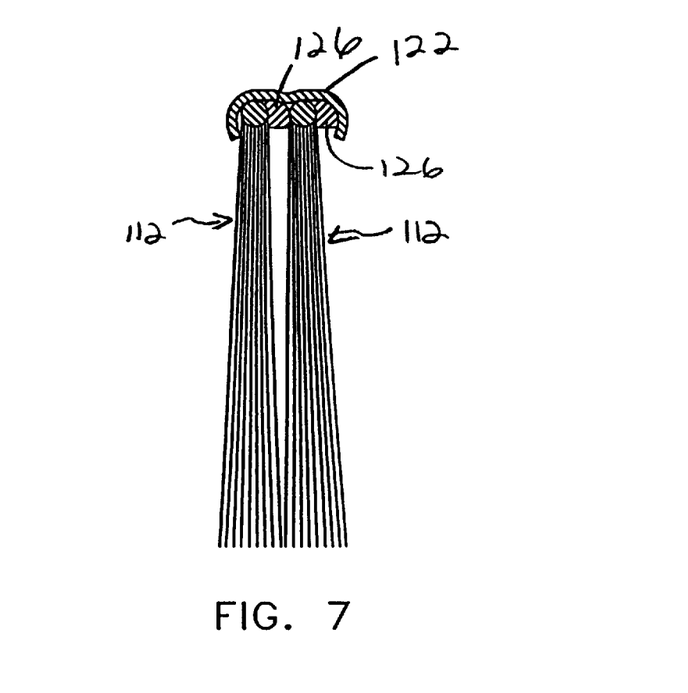
FIG. 7 is a cross-sectional view of a pair of bristle strips mounted within a single annular holder.

It should be appreciated that while two rails are disclosed, the flexible bristle strips can also be fabricated by attaching the bristle packs to a single, flexible rail 126 as shown in FIG. 6A. In addition, multiple strips can be captured in a single U-shaped ring, thereby making the inner diameter more continuous by placing adjacent bristle packs closer together (FIG. 7). Such modifications are within the scope of the present embodiment, as would be known to one of skill in the art.

The flexible bristle strips either with double rails or a single rail, can also be directly attached to a housing, for example by welding or brazing. The attachment may be simplified by forming channels in the housing and attaching the bristle strip to the housing, as shown in the embodiment of FIG. 8.

Figure 8:
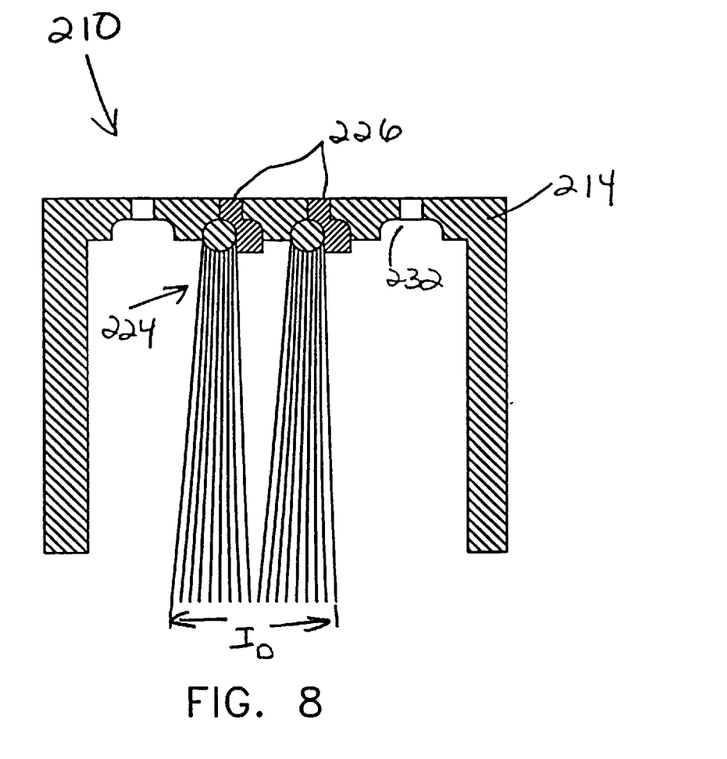
FIG. 8 is a cross-sectional side view of a compliant brush shroud assembly including multiple bristle strips mounted within channels in a housing, in accordance with a second embodiment of the present invention.

Referring now to FIG. 8, the second embodiment or insert brush assembly 210 is illustrated. As with the shroud ring configuration, the bristle strips are flared in order to ensure a continuous surface. However, in this embodiment the annular ring is completely eliminated and channels are utilized to constrain the bristle packs. The flexible bristle packs are secured to either a single rail 226 or a double rail (not shown) to form the bristle strips 224, which are then secured directly to the housing, through a plurality of grooves or channels 232 disposed in the housing 214. For example, channels may be machined into the housing along an inner, upper edge of the housing, and the bristle strips may be welded or brazed through the channels. Alternately, other manners of forming the channels and attaching the strips therein may be utilized, as would be known to those of skill in the art.

The channels 232 and rails 226 may preferably have a stepped configuration, and the rails 226 may preferably extend from within the channels, as also shown in FIG. 8. By extending from within the channels, the rails further contact and constrain the $O_D$ of the bristle strips. As with the first embodiment, the constrained length of the bristle strip is a very small portion of the entire length, so that the bristle strip flares outward toward the free end thereof, making the $I_D$ of the insert shroud assembly continuous. In addition, the stepped configuration of the channels helps to prevent the rails 226 from pulling free from the channel during use. Although the channels are shown as being formed within the housing, as a unitary member, they could also be formed within a separate member and attached to the inner, upper edge of the housing.

Figure 9:
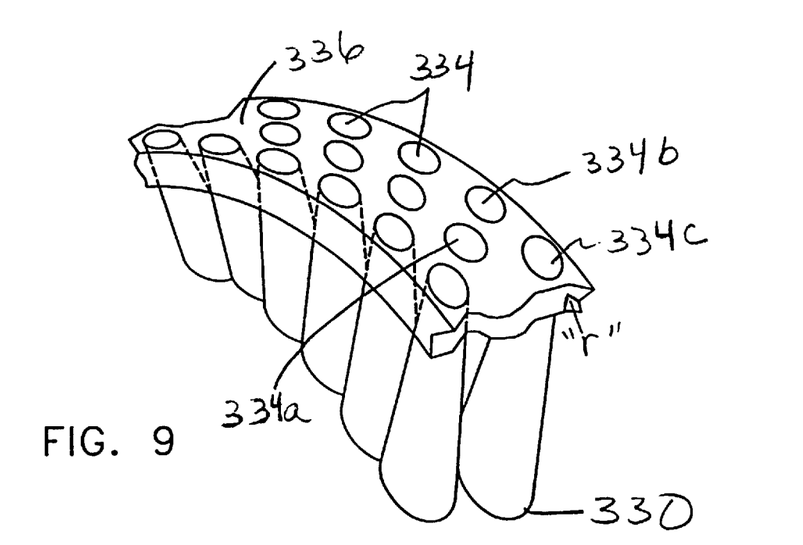
FIG. 9 is a perspective view of a tufted ring of bristles in accordance with a third embodiment.
Figure 10:
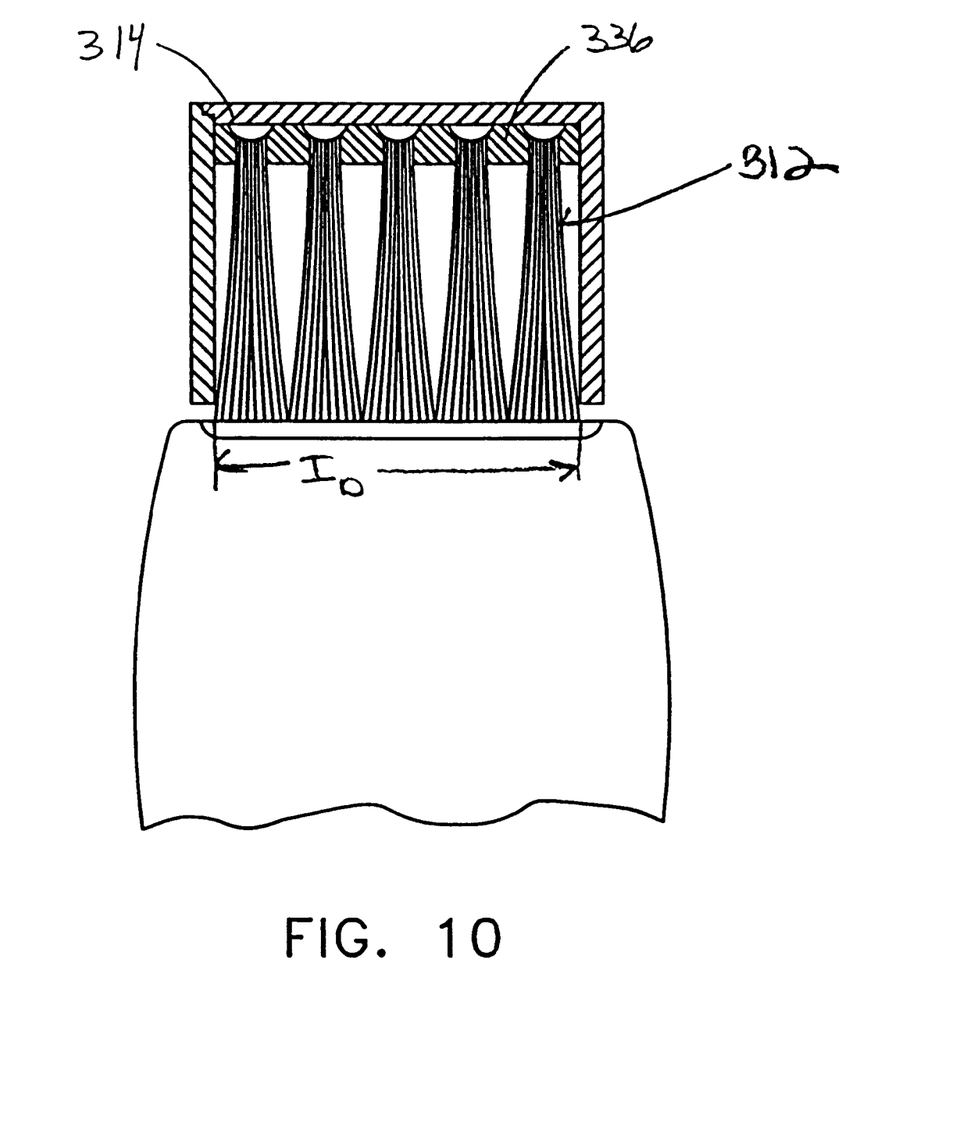
FIG. 10 is a cross-sectional side view of a compliant brush shroud assembly including the tufted ring of FIG. 9 mounted within a housing.

A continuous bristle pack inner diameter can also be achieved by forming tufted bristle strips, similar to a shoe brush, as shown in FIG. 9. Referring now to FIGS. 9–10, the third embodiment or tufted ring configuration is illustrated. In order to form the tufted ring, a plurality of holes 334 are machined within a holding ring 336, for example by drilling. The holes may preferably be formed in rows "r", and are disposed such that they are in close proximity to each other, i.e. in a close-packed pattern, preferably between about $\frac{1}{10}$ to $\frac{2}{10}$th of an inch apart. The orientation of the holes is preferably offset such that a hole 334a in one row fall between the two holes 334b, 334c in the adjacent rows, in order to allow for the close packing of the holes. The width and the depth of the holes is dependent upon the overall size of the bristle packs which are to be supported therein. The holes operate to constrain the bristles at the outer diameter. As with the previous embodiments, the constrained length of the bristle packs 312 should be a small portion of their entire length, so that the tufts flare open at their free ends 330. The tufts, like strips, can be flared more by compressing the tufts at a point midway between the tuft length. By controlling the size (width and depth) of the holes, the tuft length, and the distance between the tuft holes, the flared ends of the tufts can be made to contact each other thereby generating a continuous surface at the $I_D$, as shown in FIG. 10. It will be appreciated that the size of the tufts, the size and the spacing of the holes may (and should) be varied, so that the surface is continuous, as would be know to those of skill in the art. After the holes are formed in the holding ring, metallic bristle packs can then be inserted into the holes, and a plurality of rings may be arranged in parallel and inserted within housing 314. The final inner diameter of this brush shroud assembly may then be precision machined using Electro Discharge Machining or other similar processes such as plunge grinding.

Figure 11:
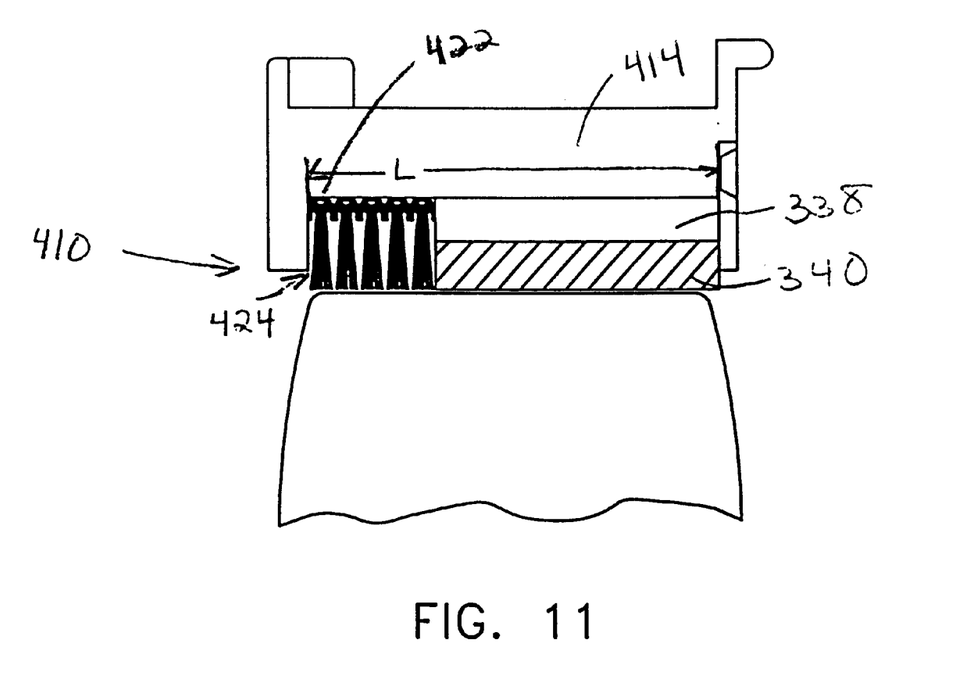
FIG. 11 is a side view of a hybrid brush shroud casing including a brush shroud in a forward section and an abradable seal mounted rearwardly thereof in accordance with a fourth embodiment.

Any of the previously described embodiments, the shroud ring configuration, the insert configuration, or the tufted ring configuration, may be utilized in combination with a backplate supporting an abradable seal to form a hybrid design. Referring now to FIG. 11, the forth embodiment or hybrid assembly 410 is illustrated. As with the previous embodiments, the bristle packs are flared in order to ensure a continuous surface. However, in this embodiment the bristle strips having a continuous surface extend for only about 25–50% of the length ("L") of the housing 414. The remaining 50–75% of the length of the housing preferably supports a back plate 338 having an abradable seal 340 supported on an inner surface 342, and preferably made from either a felt metal or a soft coating, as is conventional.

In the embodiment of FIG. 11, the flexible bristle strips 424 are mounted within annular shroud rings 422 and supported within the housing 414, as described above with respect to the first embodiment. However, it will be appreciated that the flared bristle strips may be supported within the housing in alternate manners, for example through channels or tufted rings as described above. By combining the flared bristle strips having a continuous surface with the abradable seal, the gap clearance can be decreased in both the forward and rear section, because the wearing away of the abradable seal during short duration rubs will not interfere with performance due to the inclusion of the flared bristle strips in the forward portion of the housing. This embodiment is expected to have a lower cost and weight than the previous embodiments because the combined weight of the back plate, abradable seal and bristle strips should weigh less and be less expensive than the bristle strip assemblies alone. In addition, the cost of use can expected to be less because the bristle strip assemblies are expected to be replaced less often than conventional abradable seals, and the cost to replace the bristle strip assemblies described herein is also expected to be less than that of conventional bristle packs. Also, the abradable seal need not be replaced just because the gap clearance has become larger, since the continuous surface resulting from the forward mounted flared bristle strips should maintain the compressors performance within acceptable limits.

It will be appreciated that the compliant brush shroud assemblies described herein all have a good resistance to damage caused by short-duration rotor rubs so as to allow for increased performance overall and less frequent engine repairs, are relatively light weight and cost effective to manufacture and replace, if needed.

It will be understood that various modifications may be made to the embodiment disclosed herein. For example, the dimensions given are approximate may be changed, as would be known to those of skill in the art. Also, the materials utilized may be substituted, as appropriate. In addition, although an annular holder is shown and described as U-shaped, it should be understood that the annular holder may take other configurations. For example, the holder may have an L-shaped configuration, with the bristle strip being secured to the holder such as by tack welding. In addition, pieces which are shown or described as unitary may be formed separately, and vice versa. Also, the brush shroud assembly may be used for land based applications, as well as the aerospace applications specifically disclosed herein. Therefore, the above description should not be construed as limiting, but merely as exemplifications of a preferred embodiment. Those skilled in the art will envision other modifications within the scope, spirit and intent of the invention.

What is claimed is:

1. A compliant brush shroud assembly for use with a gas turbine engine, the brush shroud assembly comprising:
    a housing;
    at least two bristle strips, each comprising at least two bristle packs, each bristle pack being secured to at least one rail and including a first end defining an outer diameter and being constructed and arranged to be secured within the housing, and a second end opposite the first end defining an inner diameter, the bristle packs being constrained at the first end and free at the second end, such that the width at the outer diameter is less than that at the inner diameter and the second end is flared relative to the first end;
    at least two annular rings; and
    wherein each of the at least two bristle strips is supported within a corresponding annular ring such that an outer diameter of the at least one rail is disposed adjacent an inner diameter of the corresponding annular ring, and wherein adjacent annular rings are in contact along at least a portion of an outer surface of the adjacent annular rings, the free second ends of the bristle packs extending from the annular ring and having a width greater than the width of the bristle strip and annular ring combined such that upon securing the bristle packs within the housing the free second ends of adjacent bristle packs form a continuous surface.

2. The assembly of claim 1, wherein the bristle packs are supported between a pair of rails.

3. The assembly of claim 1, wherein the annular ring is generally U-shaped.

4. The assembly of claim 1, wherein two or more bristle strips are supported within a single annular ring.

5. The assembly of claim 1, wherein the housing includes one or more channels disposed therein, the channels being constructed and arranged to support the bristle strips.

6. The assembly of claim 5, wherein the one or more channels have a stepped configuration.

7. The assembly of claim 5, wherein the one or more rails extend from within the channels.

8. The assembly of claim 1, further comprising a holding ring having a plurality of holes constructed and arranged to support and constrain the first end of each of the bristle packs.

9. The assembly of claim 8, wherein the plurality of holes are formed in rows, the rows being offset from each other such that a hole in a first row falls between adjacent holes in a second row.

10. The assembly of claim 1, wherein the first end of the bristle pack is constrained for a length equal to about 10% of the total length of the bristle pack.

11. A compliant brush shroud assembly for use with a gas turbine engine, the brush shroud assembly comprising:
    a housing;
    at least two bristle packs including a first end defining an outer diameter and being constructed and arranged to be secured within the housing, and a second end opposite the first end defining an inner diameter, the bristle packs being constrained at the first end and free at the second end such that the width at the outer diameter is less than that at the inner diameter and the second end is flared relative to the first end;
    at least two annular rings; and
    wherein upon securing at least two annular rings and the bristle packs within the housing, adjacent annular rings are in contact along at least a portion of an outer surface of the adjacent annular rings and the bristle packs are supported within a first portion of the housing for about 25–50% of a total length of the housing, a back plate having an abradable seal is supported within the remaining 50"75% of the length of the housing, and the free second ends of adjacent bristle packs form a continuous surface.

12. A compliant brush shroud assembly for use with a gas turbine engine, the brush shroud assembly comprising:

a housing;

at least two bristle strips, each comprising at least two bristle packs, each bristle pack being secured to at least one rail and including a first end defining an outer diameter and being constructed and arranged to be secured within the housing, and a second end opposite the first end defining an inner diameter, the bristle packs each being free at the second end and having a constrained first end, so that the width at the outer diameter is less than that at the inner diameter and the second end is flared relative to the first end;

at least two annular rings, each of the at least two annular rings being spaced from the at least two bristle packs, such that the at least two annular rings are out of direct contact with the at least two bristle packs; and wherein each of the at least two bristle strips is supported within a corresponding annular ring such that an outer diameter of the at least one rail is disposed adjacent an inner diameter of the corresponding annular ring, and wherein adjacent annular rings are in contact along at least a portion of an outer surface of the adjacent annular rings, the free second ends of the bristle packs extending from the annular ring and having a width greater than the width of the bristle strip and annular ring combined such that upon securing the bristle packs within the housing the free second ends of adjacent bristle packs forms a substantially continuous surface.

13. The assembly of claim 12, wherein two or more bristle strips are supported within a single annular ring.

14. The assembly of claim 12, wherein the housing includes one or more channels disposed therein, the channels being constructed and arranged to support the bristle strips.

15. The assembly of claim 12, further comprising a holding ring having a plurality of holes constructed and arranged to support and constrain the first end of each of the bristle packs.

16. The assembly of claim 15, wherein the plurality of holes are formed in rows, the rows being offset from each other such that a hole in a first row falls between adjacent holes in a second row.

17. A compliant brush shroud assembly for use with a gas turbine engine, the brush shroud assembly comprising:

a housing;

at least two bristle strips, each comprising at least two bristle packs, each bristle pack being secured to at least one rail and including a first end defining an outer diameter and being constructed and arranged to be secured within the housing, and a second end opposite the first end defining an inner diameter, the bristle packs each being free at the second end and having a constrained first end, so that the width at the outer diameter is less than that at the inner diameter and the second end is flared relative to the first end;

at least two annular rings, each of the at least two annular rings being spaced from the at least two bristle packs, such that the at least two annular rings are out of direct contact with the at least two bristle packs; and wherein upon securing the at least two annular rings and the bristle packs within the housing, adjacent annular rings are in contact along at least a portion of an outer surface of the adjacent annular rings and the bristle packs are supported within a first portion of the housing for about 25–50% of a total length of the housing a back plate having an abradable seal is supported within the remaining 50–75% of the length of the housing, and the free second ends of adjacent bristle packs form a substantially continuous surface.

* * * * *